United States Patent
Wendel et al.

(10) Patent No.: US 6,858,654 B1
(45) Date of Patent: Feb. 22, 2005

(54) CATALYST BLENDS FOR PRODUCING LOW THERMAL DESORPTION POLYURETHANE FOAMS

(75) Inventors: Stephan Herman Wendel, Oldenburg (DE); Steven Paul Hulme, Tytherington (GB); Mark Leo Listemann, Kutztown, PA (US); Reza Fard-Aghai, Hamburg (DE); Juan Jesus Burdeniuc, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/695,515

(22) Filed: Oct. 27, 2003

(51) Int. Cl.⁷ .................................................. C08J 9/08
(52) U.S. Cl. ..................... 521/129; 521/128; 521/130; 521/170
(58) Field of Search ................................. 521/128, 129, 521/130, 170

(56) References Cited

U.S. PATENT DOCUMENTS

| | | |
|---|---|---|
| 4,007,140 A | 2/1977 | Ibbotson |
| 4,012,445 A | 3/1977 | Priest et al. |
| 4,049,591 A | 9/1977 | McEntire et al. |
| 4,094,827 A | 6/1978 | McEntire |
| 4,101,470 A | 7/1978 | McEntire |
| 4,143,071 A | 3/1979 | McEntire |
| 4,194,069 A | 3/1980 | Speranza et al. |
| 4,242,467 A | 12/1980 | Zimmerman |
| 4,248,930 A | 2/1981 | Haas et al. |
| 4,330,656 A | 5/1982 | Grögler et al. |
| 4,338,408 A | 7/1982 | Zimmerman et al. |
| 4,430,455 A | 2/1984 | Raden et al. |
| 4,433,170 A | 2/1984 | Zimmerman et al. |
| 4,644,017 A | 2/1987 | Haas et al. |
| 4,735,970 A | 4/1988 | Sommerfeld et al. |
| 5,200,434 A | 4/1993 | Bailey et al. |
| 5,756,557 A | 5/1998 | Kimock et al. |
| 5,824,711 A | 10/1998 | Kimock et al. |
| 5,859,079 A | 1/1999 | Mercando et al. |
| 6,051,527 A | 4/2000 | Savoca et al. |
| 6,201,033 B1 | 3/2001 | Mercando et al. |
| 6,232,356 B1 | 5/2001 | Mercando et al. |
| 6,737,446 B1 * | 5/2004 | Burdeniuc .................. 521/128 |
| 6,747,069 B1 * | 6/2004 | Burdeniuc .................. 521/128 |
| 6,759,447 B1 * | 7/2004 | Burdeniuc et al. .......... 521/128 |

FOREIGN PATENT DOCUMENTS

| | | |
|---|---|---|
| DE | 30 27 796 A | 2/1982 |
| EP | 1 092 737 B1 | 9/2003 |
| GB | 1338275 | 11/1973 |

* cited by examiner

*Primary Examiner*—John M. Cooney, Jr.
(74) *Attorney, Agent, or Firm*—Michael Leach

(57) ABSTRACT

A catalyst composition for catalyzing a polyurethane forming reaction includes a gelling catalyst and a blowing catalyst selected such that the resulting polyurethane foam has a low level of volatile and/or malodorous material in it. The gelling catalysts are selected from tertiary aminoalkyl substituted primary or secondary amines; and the blowing catalysts are selected from bis(aminoalkyl) ethers comprising alkanol moieties, primary amine moieties, or ureido moieties derived from such primary amine moieties.

20 Claims, No Drawings

CATALYST BLENDS FOR PRODUCING LOW THERMAL DESORPTION POLYURETHANE FOAMS

BACKGROUND OF THE INVENTION

The present invention relates to compositions and processes for making polyurethane foams. More particularly, it relates to compositions and processes incorporating tertiary amine catalysts capable of providing foams having reduced levels of odor and volatile emissions.

Polyurethane foams are widely known and used in automotive, housing and other industries. Such foams are produced by reaction of a polyisocyanate with a polyol in the presence of a catalyst and a blowing agent, historically a chlorofluorocarbon (CFC) compound. Due to environmental concerns relating to CFC's, the use of water blown foam formulations, in which at least some of the blowing is performed with $CO_2$ generated by the reaction of water with the polyisocyanate, has become increasingly important. Such systems typically employ tertiary amine catalysts to accelerate both the blowing (reaction of water with isocyanate to generate $CO_2$) and gelling (reaction of polyol with isocyanate) reactions required to make a foam. However, known tertiary amine catalyst compositions may give rise to objectionable releases of volatile and often malodorous materials into the air during foam manufacture and/or thereafter. The present invention addresses the issue of how to reduce such emissions, using certain catalyst compositions.

BRIEF SUMMARY OF THE INVENTION

In one aspect, the invention is a catalyst composition comprising:

1) a gelling catalyst represented by the general formula:

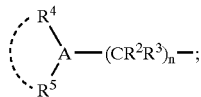

in which:

A represents CH or N, $R^1$ represents hydrogen or the group

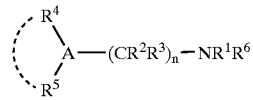

n represents an integer between 1 and 3, inclusive, $R^2$ and $R^3$ each represent hydrogen or a C1–C6 alkyl group, and $R^8$ represents H or 3-aminopropyl, provided that:
when A is N, $R^4$ and $R^5$ each represents a C1–C6 alkyl group or together represent a C2–C5 alkylene group which may contain a ring amine moiety —NR—, where R is hydrogen, a C1–C4 alkyl group, or the group

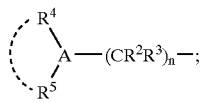

and
when A is CH, $R^4$ and $R^5$ together represent a C2–C5 alkylene group containing a ring amine moiety —NR—, where R is a C1–C4 alkyl group or the group

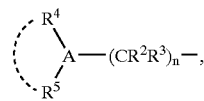

2) a blowing catalyst according to the general formula:

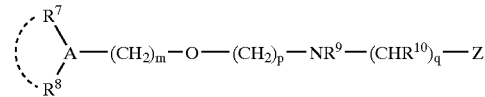

wherein:

$R^7$, $R^8$, and $R^9$ each independently represents a C1–C4 alkyl group;

$R^{10}$ represents H, a C1–C4 alkyl group, a C6–C20 aryl group, or a C6–C20 aralkyl group;

m, p, and q each independently represents an integer between 1 and 4, inclusive; and Z represents —OH, —$NH_2$, —NH—CO—$NH_2$, or

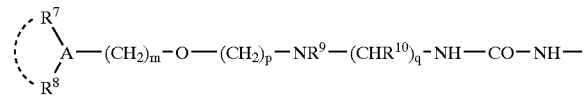

In another aspect, the invention is a formulation for producing a polyurethane foam, the formulation comprising a polyol, a polyisocyanate, water, and a catalyst composition comprising:

1) a gelling catalyst represented by the general formula:

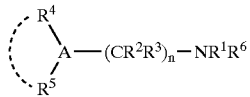

in which:

A represents CH or N, $R^1$ represents hydrogen or the group

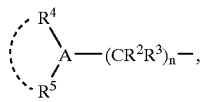

n represents an integer between 1 and 3, inclusive, $R^2$ and $R^3$ each represent hydrogen or a C1–C6 alkyl group, and $R^6$ represents H or 3-aminopropyl, provided that:
when A is N, $R^4$ and $R^5$ each represents a C1–C6 alkyl group or together represent a C2–C5 alkylene group which may contain a ring amine moiety —NR—, where R is hydrogen, a C1–C4 alkyl group, or the group

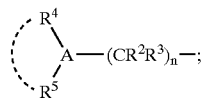

and
when A is CH, $R^4$ and $R^5$ together represent a C2–C5 alkylene group containing a ring amine moiety —NR—, where R is a C1–C4 alkyl group or the group

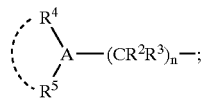

2) a blowing catalyst according to the general formula:

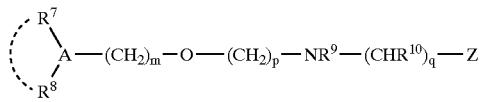

wherein:

$R^7$, $R^8$, and $R^9$ each independently represents a C1–C4 alkyl group;

$R^{10}$ represents H, a C1–C4 alkyl group, a C6–C20 aryl group, or a C6–C20 aralkyl group;

m, p, and q each independently represents an integer between 1 and 4, inclusive; and Z represents —OH, —$NH_2$, —NH—CO—$NH_2$, or

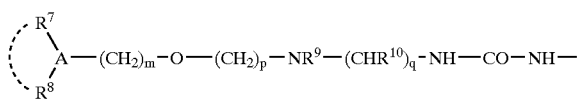

In yet another aspect, the invention is a polyurethane foam comprising a product of a reaction between a polyol and a polyisocyanate, the reaction taking place in the presence of water and a catalyst composition comprising:

1) a gelling catalyst represented by the general formula:
in which:

A represents CH or N,
$R^1$ represents hydrogen or the group

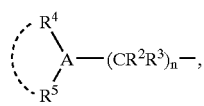

n represents an integer between 1 and 3, inclusive,
$R^2$ and $R^3$ each represent hydrogen or a C1–C6 alkyl group, and
$R^6$ represents H or 3-aminopropyl, provided that:
when A is N, $R^4$ and $R^5$ each represents a C1–C6 alkyl group or together represent a C2–C5 alkylene group which may contain a ring amine moiety —NR—, where R is hydrogen, a C1–C4 alkyl group, or the group

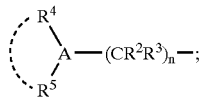

and
when A is CH, $R^4$ and $R^5$ together represent a C2–C5 alkylene group containing a ring amine moiety —NR—, where R is a C1–C4 alkyl group or the group

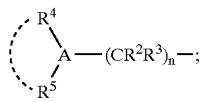

2) a blowing catalyst according to the general formula:

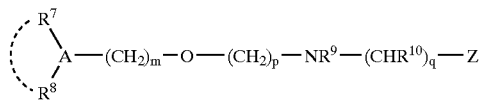

wherein:
$R^7$, $R^8$, and $R^9$ each independently represents a C1–C4 alkyl group;
$R^{10}$ represents H, a C1–C4 alkyl group, a C6–C20 aryl group, or a C6–C20 aralkyl group;
m, p, and q each independently represents an integer between 1 and 4, inclusive; and Z represents —OH, —$NH_2$, —NH—CO—$NH_2$, or

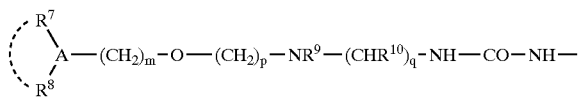

In a further aspect, the invention is a method of making a polyurethane foam, the method comprising mixing together a polyol, a polyisocyanate, water, and a catalyst composition comprising:

1) a gelling catalyst represented by the general formula:

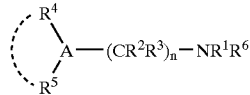

in which:
A represents CH or N,
$R^1$ represents hydrogen or the group

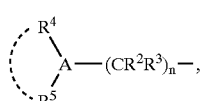

n represents an integer between 1 and 3, inclusive,
$R^2$ and $R^3$ each represent hydrogen or a C1–C6 alkyl group, and
$R^6$ represents H or 3-aminopropyl, provided that:
when A is N, $R^4$ and $R^5$ each represents a C1–C6 alkyl group or together represent a C2–C5 alkylene group which may contain a ring amine moiety —NR—, where R is hydrogen, a C1–C4 alkyl group, or the group

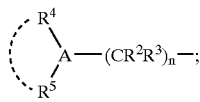

and
when A is CH, $R^4$ and $R^5$ together represent a C2–C5 alkylene group containing a ring amine moiety —NR—, where R is a C1–C4 alkyl group or the group

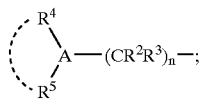

and 2) a blowing catalyst according to the general formula:

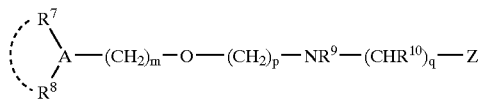

wherein:
$R^7$, $R^8$, and $R^9$ each independently represents a C1–C4 alkyl group;

$R^{10}$ represents H, a C1–C4 alkyl group, a C6–C20 aryl group, or a C6–C20 aralkyl group;

m, p, and q each independently represents an integer between 1 and 4, inclusive; and Z represents —OH, —NH$_2$, —NH—CO—NH$_2$, or

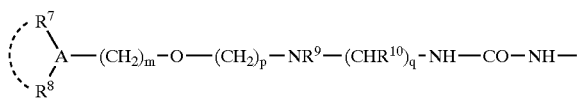

DETAILED DESCRIPTION OF THE INVENTION

Catalyst compositions according to the invention comprise a gelling catalyst and a blowing catalyst, both of which comprise tertiary amine groups. The gelling catalyst additionally comprises a primary or secondary amine group. The blowing catalyst additionally comprises one or more of a primary or secondary amine group, a hydroxyl group, and a urea group. Without wishing to be bound by any particular theory or explanation, it is believed that the presence of such functional groups provides hydrogen bonding ability with the polyol(s) and or polyisocyanate(s) used in making the polyurethane foams, as well as with chemical functionalities in the foams themselves, resulting in reduced volatility and odor when compared with related tertiary amine catalysts lacking these functional groups. It is further believed that these functional groups may allow reaction of these catalysts into the polyurethane foam, thereby preventing or at least reducing their release from the foams.

The present invention provides catalyst compositions for making polyurethane foams, and methods for using these compositions. The catalyst compositions comprise mixtures of gelling catalysts selected from tertiary aminoalkyl substituted primary or secondary amines; and blowing catalysts selected from bis(aminoalkyl) ethers comprising alkanol moieties, primary amine moieties, or ureido moieties derived from such primary amine moieties. The catalyst compositions produce polyurethane foams that have low amine odor and low catalyst-derived emissions, as measured by thermal desorption testing techniques.

The present invention provides catalyst compositions suitable for catalyzing the reaction between an isocyanate functionality and an active hydrogen-containing compound, i.e. an alcohol, a polyol, an amine or water. In particular, the catalyst compositions catalyze the urethane (gelling) reaction of polyol hydroxyl groups with isocyanate to make polyurethanes, and the blowing reaction of water with isocyanate to release carbon dioxide for making foamed polyurethanes. It should be noted however that neither of the two groups of catalysts described herein necessarily performs exclusively either gelling or blowing catalysis functions. Rather, these labels indicate the primary function of these catalyst components when used according to the invention.

As used herein, the term "polyurethane" is intended to mean polyurethane and/or polyisocyanurate, as is understood in the art. Thus a polyurethane foam can be a polyurethane and/or polyisocyanurate foam. Typically, formation of the foam is aided by incorporation in the reaction mixture of a suitable blowing agent, as is known in the art. Typically a surfactant, such as a silicone surfactant, is also included to help regulate foam formation, as is also known in the art.

Polyisocyanate

Polyurethane products made in accordance with the invention may be prepared using any suitable organic polyisocyanates well known in the art for making polyurethane foam including, for example, hexamethylene diisocyanates, isophorone diisocyanates, phenylene diisocyanates, toluene diisocyanates (TDI) and 4,4'-diphenylmethane diisocyanates (MDI). Especially suitable are mixtures of diisocyanates known commercially as "crude MDI", marketed as PAPI by Dow Chemical, which contain about 60% of 4,4'-diphenylmethane diisocyanates along with other isomeric and analogous higher polyisocyanates. Other suitable isocyanates are the 2,4 and 2,6-TDI's individually or together as their commercially available mixtures. Also suitable are "prepolymers" of these polyisocyanates comprising a partially pre-reacted mixture of a polyisocyanate and a polyether or polyester polyol. Typically, the above polyisocyanates are used in an amount relative to the polyol to establish an isocyanate index in the range of 80 to 400.

Polyol

Suitable polyols for making polyurethane foams in conjunction with the catalyst compositions of the invention are those typically used in the art, including for example polyalkylene ether and polyester polyols. Polyalkylene ether polyols include poly(ethylene oxide) and poly(propylene oxide) polymers and copolymers with terminal hydroxyl groups derived from polyhydric compounds, for example diols and/or triols. Such diols and triols include, as non-limiting examples, ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, sugars such as sucrose, and other low molecular weight polyols. Also useful are amine polyether polyols which can be prepared by reacting an amine, such as ethylenediamine, diethylenetriamine, tolylenediamine, diphenylmethanediamine, triethanolamine or the like, with ethylene oxide or propylene oxide.

In the practice of this invention, a single high molecular weight polyether polyol such as described above may be used. Also, mixtures of such high molecular weight polyether polyols, for example mixtures of different multifunctional materials and/or of compounds having different molecular weights or different chemical compositions, may be used. Useful polyester polyols include those produced by reacting a dicarboxylic acid with an excess of a diol, for example, adipic acid or phthalic acid anhydride with ethylene glycol or butanediol, or reacting a lactone such as caprolactone with an excess of a diol such as propylene glycol.

In addition to the polyester and polyether polyols noted above, the polyol component of the polyurethane formulation frequently comprises a polymer polyol. Such polymer polyols my be used in polyurethane foams to increase the foam's resistance to deformation, i.e. to increase the load-bearing properties of the foam. One type of polymer polyol, referred to in the art as a graft polyol, consists of a triol in which vinyl monomers are graft copolymerized. Styrene and acrylonitrile are the usual monomers of choice. A second type, a polyurea modified polyol, is a polyol containing a polyurea dispersion formed by the reaction of a diamine and TDI. The TDI is typically used in excess, and therefore some of the TDI may react with both the polyol and polyurea. The second type of polymer polyol may for example be a material called a PIPA polyol, which is formed by the in-situ polymerization of TDI and alkanolamine in the polyol. Depending on the load-bearing requirements and other parameters, polymer polyols may comprise 20–80% of the polyol portion of the polyurethane formulation. If polymer polyols constitute a part of the overall polyol charge, their weight is included in the total polyol weight for purposes of calculating the relative amounts of other ingredients according to the pphp parts per hundred parts polyol) convention.

Blowing Agent

Blowing agents used according to the invention for making polyurethane foams are any commonly used blowing agents known in the art. These include, as nonlimiting examples, HCFC (hydrochlorofluorocarbon) compounds, HFC (hydrofluorocarbon) compounds, chlorofluorocarbons, pentanes, and mixtures of these. The formulations contain water, typically at between 0.1 and 7 pphp (parts per hundred parts of polyol), more typically between 2.5 and 4.5 pphp, to produce $CO_2$ to help create a foam.

Catalyst Composition

Catalyst compositions according to the invention comprise mixtures of: 1) gelling catalysts selected from tertiary aminoalkyl substituted primary or secondary amines, and 2) blowing catalysts selected from bis(aminoalkyl) ethers comprising alkanol moieties, primary amine moieties, or ureido moieties derived from such primary amine moieties. It is important that a combination of gelling and blowing catalyst according to the invention be used, rather than either one alone or in combination with a catalyst not of this invention, in order to obtain the low odor and low volatiles emission provided by the invention. Detailed descriptions of the gelling and blowing catalysts follow.

Gelling Catalysts

Gelling catalysts suitable for use according to the invention are represented by the general formula:

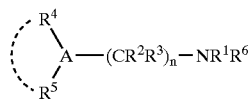

in which:

A represents CH or N, $R^1$ represents hydrogen or the group

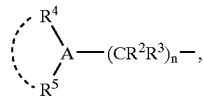

n represents an integer between 1 and 3, inclusive, $R^2$ and $R^3$ each represent hydrogen or a C1–C6 alkyl group, and $R^6$ represents H or 3-aminopropyl, provided that:

when A is N, $R^4$ and $R^5$ each represents a C1–C6 alkyl group or together represent a C2–C5 alkylene group which may contain a ring amine moiety —NR—, where R is hydrogen, a C1–C4 alkyl group, or the group

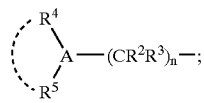

and when A is CH, $R^4$ and $R^5$ together represent a C2–C5 alkylene group containing a ring amine moiety —NR—, where R is a C1–C4 alkyl group or the group

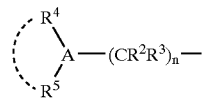

In one embodiment of the invention, $R^4$ and $R^5$ are each a methyl group, A is nitrogen, and $R^2$ and $R^3$ are each hydrogen. In another embodiment of the invention, A is CH, n is an integer between 1 and 3, inclusive, and $R^4$ and $R^5$ together constitute —$CH_2CH_2N(CH_3)CH_2$—.

Illustrative examples of tertiary aminoalkyl substituted primary or secondary amines suitable for use according to the invention include 3-dimethylaminopropylamine, N,N,N'',N''-tetramethyldipropylenetriamine, and N,N-bis(3-dimethylaminopropyl)-1,3-propanediamine. Reference to the preparation of these compounds can be found in GB 1,338,275 and U.S. Pat. No. 4,248,930.

Blowing Catalysts

Blowing catalysts suitable for use according to the invention are bis(aminoalkyl) ethers comprising alkanol moieties, primary amine moieties, or ureido moieties derived from such primary amine moieties, as represented by the general formula:

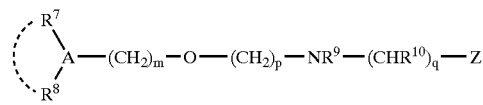

wherein:

$R^7$, $R^8$, and $R^9$ each independently represents a C1–C4 alkyl group;

$R^{10}$ represents H, a C1–C4 alkyl group, a C6–C20 aryl group, or a C6–C20 aralkyl group;

m, p, and q each independently represents an integer between 1 and 4, inclusive; and Z represents —OH, —$NH_2$, —NH—CO—$NH_2$, or

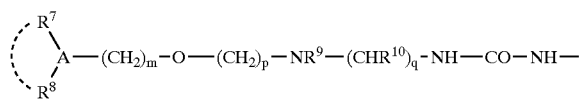

In one embodiment of the invention, the blowing catalyst according to the above structure is such that $R^7$, $R^8$, and $R^9$ are each a methyl group, m and p are each equal to 2, and q is either 2 or 3.

In other embodiments, the blowing catalyst may comprise one or more of N,N,N'-trimethyl-N'-2-hydroxyethylbis(aminoethyl) ether, N,N,N'-trimethyl-N'-3-aminopropylbis(aminoethyl) ether, and N,N,N'-trimethyl-N'-3-ureidopropylbis(aminoethyl) ether. Reference to the preparation of these compounds can be found in U.S. Pat. Nos. 4,433,170; 6,051,527; and 5,824,711; respectively.

In one embodiment of the invention, some or all of either the gelling or the blowing catalyst, or both, may be in the form of a corresponding carboxylic acid salt. It should be noted that the catalyst as added to a polyurethane formulation may contain the carboxylic acid already present, or the acid may be added with one or more of the other ingredients in the formulation, thereby forming the salt in situ. By providing the catalyst composition in the form of such a salt, a delayed onset of catalyst activity may be achieved. This may be beneficial in some applications, for example where a delay in viscosity increase is desired in order to facilitate mold filling.

Many carboxylic acids are suitable for preparing salts of the gelling and/or blowing catalyst components according to the invention. Nonlimiting examples include formic acid, acetic acid, propionic acid, 2-ethylhexanoic acid, aryloxy-substituted carboxylic acids such as phenoxyacetic acid and (dichlorophenoxy)acetic acid, and halogenated acids such as 2-chloropropionic acid and a ring-halogenated aromatic carboxylic acids such as chlorobenzoic acid. Further nonlimiting examples of suitable acids include hydroxy acids such as gluconic acid, hydroxyacetic acid, tartaric acid, and citric acid. It will be understood by those of ordinary skill in the art that certain acids in combination with certain gelling/blowing catalyst combinations, and under certain overall compositions of the polyurethane formulation, may detract from the low-emission performance of the catalyst compositions of the present invention. It will further be understood that the determination of acceptable combinations of acids with catalysts for a given application may therefore require some amount of routine experimentation, such as is within the ability of the skilled artisan, with such combinations still falling within the scope of the invention.

A catalytically effective amount of the catalyst composition comprising the gelling and blowing catalysts is used in the polyurethane formulation. More specifically, suitable amounts of the catalyst composition may range from about 0.01 to 10 parts by wt per 100 parts polyol (pphp) in the polyurethane formulation, preferably 0.05 to 4 pphp. Suitable weight ratios of gelling catalyst to blowing catalyst in the catalyst composition depend inter alia upon the particular ingredients in the formulation, but are typically at least 2:1, preferably at least 4:1, and at most 10:1, preferably at most 6:1. For TDI-based polyurethane formulations, a ratio of 2:1 to 4:1 is typical, while for MDI-based formulations a ratio from 3:1 to 10:1 is typical.

Variations in these ratios may be made according to the particular choice of other ingredients (polyols, polyisocyanates, etc.) in the polyurethane formulation, as commonly practiced in the art. Catalyst compositions according to the invention may also comprise other tertiary amines, organotin or carboxylate urethane catalysts, such as are well known in the urethane art.

Other Ingredients

Other typical ingredients that may optionally be used in polyurethane foam formulations made with the catalyst compositions of the invention include flame retardants, chain extenders such as ethylene glycol and butanediol; crosslinkers such as diethanolamine, diisopropanolamine, triethanolamine and tripropanolamine; and cell stabilizers such as silicones.

Preparation of polyurethane foams according to the invention can be carried out by conventional means for making polyurethane foam, using the catalyst compositions of this invention in place of previously used catalyst systems.

A typical polyurethane flexible foam formulation containing a catalyst composition comprising a gelling catalyst and a blowing catalyst according to the invention comprises the following components in parts by weight (pbw):

| Flexible Foam Formulation | pbw |
| --- | --- |
| Polyol | 20–100 |
| Polymer Polyol | 80–0 |
| Silicone Surfactant | 1–2.5 |
| Blowing agent | 2–4.5 |
| Crosslinker | 0.5–2 |
| Catalyst Composition* | 0.1–4 |
| Polyisocyanate | NCO Index = 70–115 |

*5:1 weight ratio of gelling catalyst to blowing catalyst

As used in herein, the term "NCO Index" means isocyanate index, as that term is commonly used in the polyurethane art. Use of this term in a table of formulations indicates that the appropriate amount of polyisocyanate should be used in order to achieve a formulation having the indicated NCO index.

EXAMPLES

The gelling and blowing catalysts used in the examples are abbreviated as shown in the following table.

| Catalyst | Structure |
| --- | --- |
| B | N,N-bis(3-dimethylaminopropyl)-N-isopropanolamine |
| C | N,N,N'',N''-tetramethyldipropylenetriamine |
| E | N,N,N'-trimethyl-N'-2-hydroxyethylbis(aminoethyl) ether |
| F | N,N-bis(3-dimethylaminopropyl)-1,3-propanediamine |

Polyurethane foams were prepared using a variety of catalyst compositions, including some according to the invention and some according to standard industry practice. Thermal desorption of volatile materials was performed on the foams, according to dynamic headspace testing method VDA 278.

VDA 278 is a standard polyurethane foam emission testing method used in the automotive industry to evaluate emissions from polyurethane foam under realistic conditions. In a dynamic headspace experiment, gas extraction is carried out continuously. By continuously removing the gas phase, volatile analytes are unable to re-establish equilibrium and ultimately all of the volatiles are removed from the sample, allowing a more accurate quantitative assessment.

The test method consists of two consecutive steps. In the first step, gaseous emissions, i.e. emissions that contribute to contamination of the interior air of cars, are measured at 90° C. for 0.5 h (VOC). The foam sample is placed in a thermo desorption tube. While being continuously flushed with an inert gas, this tube is conditioned for 0.5 h at 90° C. Volatiles emitting from the foam are trapped at −150° C. in a cryogenic trap. The trap is then heated to 280° C., transferring the volatiles to a gas chromatograph (GC) column, where they are separated.

In the second step, condensable emissions, i.e. emissions that contribute to fogging in cars, are measured (FOG). This analysis is performed on the sample after it has been submitted to the VOC test. The sample is conditioned at 120° C. for 60 minutes, volatiles are again trapped at −150° C., and the cryogenic trap is heated to transfer the volatiles to the GC column, where they are separated. After separation of the VOC- and FOG- emissions by GC, the emitted components are chemically identified by automated searching of a mass spectrum database.

Example 1

Evaluation of MDI Foam Thermal Desorption Testing According to VDA 278 Method

Three machine mixed MDI pad foams (approximately 45 Kg/m$^3$ density) were prepared according to the formulation in Table 1, each of the three including blowing catalyst E and one of gelling catalysts B, C, and F. Combinations 2 and 3 comprising gelling catalysts C and F, respectively, are according to the invention, while combination 1 comprising gelling catalyst B is not.

TABLE 1

| MDI-formulation | 1 | 2 | 3 |
|---|---|---|---|
| Polyether polyol (OH No. = 28) | 100 | 100 | 100 |
| Water | 3.5 | 3.5 | 3.5 |
| Diethanolamine (crosslinker) | 0.5 | 0.5 | 0.5 |
| DABCO DC 2525 Silicone Surfactant | 1.0 | 1.0 | 1.0 |
| Catalyst B | 0.8 | | |
| Catalyst C | | 0.9 | |
| Catalyst F | | | 0.6 |
| Catalyst E | 0.2 | 0.2 | 0.2 |
| Cell opener* | 1.5 | 1.5 | 1.5 |
| MDI (32.5%) | 59.0** | 59.0** | 59.0** |

*Voranol CP 1421 polyether polyol, available from The Dow Chemical Company of Midland, MI
**Amount calculated to provide an NCO Index of 95.

DABCO® DC 2525 silicone surfactant is available from Air Products and Chemicals, Inc. of Allentown, Pa.

The formulations of Table 1 represent an standard industrial MDI-seating formulations, except that formulations 2 and 3 use catalyst compositions according to the invention, as noted above. Foam was made with different catalyst packages. Use levels were matched to get equivalent foam reactivity profiles. Gelling catalysts B, C, and F were blended with blowing catalyst N,N,N'-trimethyl-N'-2-hydroxyethylbis(aminoethyl) ether (catalyst E) to control foam density.

Table 2 shows the results when pad foams made according to the formulations of Table 1 were evaluated according to the VOC portion of the VDA 278 method.

TABLE 2

| Formulation | 1 | 2 | 3 |
|---|---|---|---|
| Volatile Material | | | |
| Polypropylene glycol oligomers | 137 ppm | 116 ppm | 10 ppm |
| Siloxanes | 20 ppm | 21 ppm | 2 ppm |
| Others | 14 ppm | 10 ppm | 41 ppm |
| Decomposition products from catalysts | — | — | — |
| TOTAL | 171 ppm | 147 ppm | 53 ppm |

The results show that at 90° C./0.5 h, lower emissions were observed for formulations 2 and 3 according to the invention than for formulation 1, in which the catalyst combination (gelling catalyst B plus blowing catalyst E) is not according to the invention. The results shown in Table 2 point up the fact that, as noted above, both the gelling and blowing catalyst must be defined as set forth above. In formulation 1, blowing catalyst E is according to the invention, but gelling catalyst B is not, and therefore the catalyst composition of B plus E is not according to the invention.

Table 3 shows the results of pad foams evaluated according to the FOG portion of the VDA 278 method.

TABLE 3

| Formulation | 1 | 2 | 3 |
|---|---|---|---|
| Volatile Materials | | | |
| Polypropylene glycol oligomers | 164 ppm | 216 ppm | 24 ppm |
| Siloxanes | — | 22 ppm | — |
| Decomposition products from catalysts | 190 ppm | — | — |
| Others | 123 ppm | 71 ppm | 113 ppm |
| TOTAL | 477 ppm | 309 ppm | 137 ppm |

The results shown in Table 3 reveal significantly higher FOG values for formulation 1 comprising catalyst compositions not according to the invention, than for formulations 2 and 3 comprising catalyst compositions according to the invention.

CONCLUSION

The results detailed above indicate that, under foam thermal desorption testing conditions, foam made with gelling catalyst B (not of this invention) in combination with blowing catalyst E (formulation j) evolved significantly more volatile species than the combinations, according to the invention, of gelling catalyst C or F with blowing catalyst E (formulations 2 and 3. In the particular case of formulation 1, it is seen that catalyst decomposition products contributed heavily to emissions during VDA 278 testing. The results shown in Example 1 demonstrate that combinations of gelling catalysts and blowing catalysts according to the invention provide polyurethane foams having low levels of volatile emissions.

Although the invention is illustrated and described herein with reference to specific embodiments, the invention is not intended to be limited to the details shown. Rather, it is intended that the scope of the claims that follow includes various modifications that may be made in the details while nevertheless achieving the effects of this invention.

What is claimed is:

1. A formulation for producing a polyurethane foam, the formulation comprising a polyol, a polyisocyanate, water, and a catalyst composition comprising:

1) a gelling catalyst represented by the general formula:

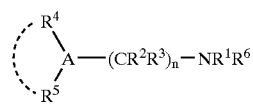

in which:

A represents CH or N, $R^1$ represents hydrogen or the group

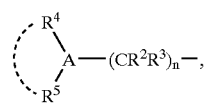

n represents an integer between 1 and 3, inclusive, $R^2$ and $R^3$ each represent hydrogen or a C1–C6 alkyl group, and $R^6$ represents H or 3-aminopropyl, provided that:

when A is N, $R^4$ and $R^5$ each represents a C1–C6 alkyl group or together represent a C2–C5 alkylene group which may contain a ring amine moiety —NR—, where R is hydrogen, a C1–C4 alkyl group,

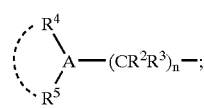

and when A is CH, $R^4$ and $R^5$ together represent a C2–C5 alkylene group containing a ring amine moiety —NR—, where R is a C1–C4 alkyl group or the group

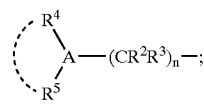

and 2) a blowing catalyst according to the general formula:

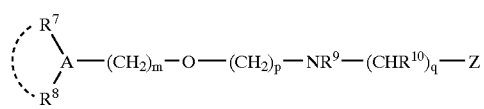

wherein:

$R^7$, $R^8$, and $R^9$ each independently represents a C1–C4 alkyl group;

$R^{10}$ represents H, a C1–C4 alkyl group, a C6–C20 aryl group, or a C6–C20 aralkyl group;

m, p, and q each independently represents an integer between 1 and 4, inclusive; and Z represents —OH, —NH$_2$, —NH—CO—NH$_2$, or

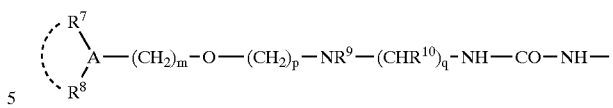

2. The formulation of claim 1, wherein $R^4$ and $R^5$ are each a methyl group, A is nitrogen, and $R^2$ and $R^3$ are each hydrogen.

3. The formulation of claim 1, wherein $R^7$, $R^8$, and $R^9$ are each a methyl group, m and p are each equal to 2, and q is either 2 or 3.

4. The formulation of claim 1, wherein A is CH, n is an integer between 1 and 3, inclusive, and $R^4$ and $R^5$ together constitute —CH$_2$CH$_2$N(CH$_3$)CH$_2$—.

5. The formulation of claim 1, wherein the gelling catalyst comprises N,N,N",N"-tetramethyldipropylenetriamine.

6. The formulation of claim 1, wherein the gelling catalyst comprises 3-dimethylaminopropylamine.

7. The formulation of claim 1, wherein the gelling catalyst comprises N,N-bis(3-dimethylaminopropyl)-1,3-propanediamine.

8. The formulation of claim 1, wherein the blowing catalyst comprises N,N,N'-trimethyl-N'-2-hydroxyethylbis(aminoethyl) ether.

9. The formulation of claim 8, wherein the gelling catalyst comprises N,N,N",N"-tetramethyldipropylenetriamine.

10. The formulation of claim 8, wherein the gelling catalyst comprises 3-dimethylaminopropylamine.

11. The formulation of claim 8, wherein the gelling catalyst comprises N,N-bis(3-dimethylaminopropyl)-1,3-propanediamine.

12. The formulation of claim 1, wherein the blowing catalyst comprises N,N,N'-trimethyl-N'-3-aminopropylbis(aminoethyl) ether.

13. The formulation of claim 1, wherein the blowing catalyst comprises N,N,N'-trimethyl-N'-3-ureidopropylbis(aminoethyl) ether.

14. The formulation of claim 1, further comprising a carboxylic acid that forms a salt with one or both of the gelling catalyst and the blowing catalyst.

15. A polyurethane foam comprising a product of a reaction between a polyol and a polyisocyanate, the reaction taking place in the presence of water and a catalyst composition comprising:

1) a gelling catalyst represented by the general formula:

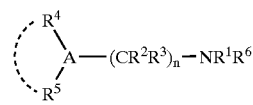

in which:

A represents CH or N, $R^1$ represents hydrogen or the group

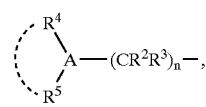

n represents an integer between 1 and 3, inclusive, $R^2$ and $R^3$ each represent hydrogen or a C1–C6 alkyl group, and $R^6$ represents H or 3-aminopropyl, provided that:

when A is N, $R^4$ and $R^5$ each represents a C1–C6 alkyl group or together represent a C2–C5 alkylene group which may contain a ring amine moiety —NR—, where R is hydrogen, a C1–C4 alkyl group, or the group

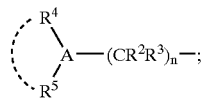

and
when A is CH, $R^4$ and $R^5$ together represent a C2–C5 alkylene group containing a ring amine moiety —NR—, where R is a C1–C4 alkyl group or the group

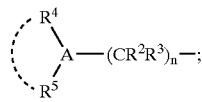

and PS 2) a blowing catalyst according to the general formula:

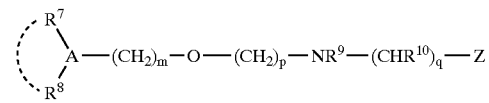

wherein:
$R^7$, $R^8$, and $R^9$ each independently represents a C1–C4 alkyl group;
$R^{10}$ represents H, a C1–C4 alkyl group, a C6–C20 aryl group, or a C6–C20 aralkyl group;
m, p, and q each independently represents an integer between 1 and 4, inclusive; and Z represents —OH, —$NH_2$, —NH—CO—$NH_2$, or

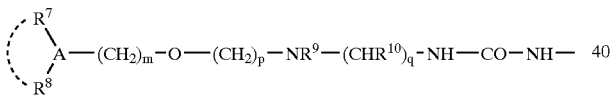

16. A method of making a polyurethane foam, the method comprising mixing together a polyol, a polyisocyanate, water, and a catalyst composition comprising:
1) a gelling catalyst represented by the general formula:

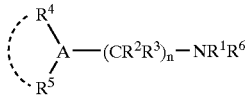

in which:
A represents CH or N,
$R^1$ represents hydrogen or the group

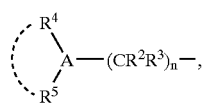

n represents an integer between 1 and 3, inclusive,
$R^2$ and $R^3$ each represent hydrogen or a C1–C6 alkyl group, and $R^6$ represents H or 3-aminopropyl, provided that
when A is N, $R^4$ and $R^5$ each represents a C1–C6 alkyl group or together represent a C2–C5 alkylene group which may chain a ring amine moiety —NR—, where R is hydrogen, a C1–C4 alkyl group, or the group

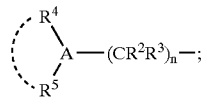

and
when A is CH, $R^4$ and $R^5$ together represent a C2–C5 alkylene group containing a ring amine moiety —NR—, where R is a C1–C4 alkyl group or the group

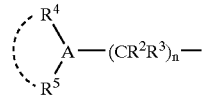

2) a blowing catalyst according to the general formula:

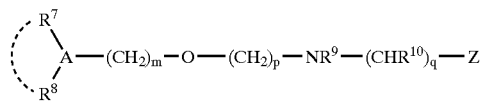

wherein:
$R^7$, $R^8$, and $R^9$ each independently represents a C1–C4 alkyl group;
$R^{10}$ represents H, a C1–C4 alkyl group, a C6–C20 aryl group, or a C6–C20 aralkyl group;
m, p, and q each independently represents an integer between 1 and 4, inclusive; and Z represents —OH, —$NH_2$, —NH—CO—$NH_2$, or

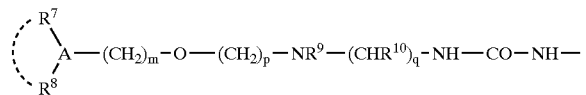

.

17. The method of claim 16, wherein the blowing catalyst comprises N,N,N'-trimethyl-N'-2-hydroxyethylbis(aminoethyl) ether.

18. The method of claim 16, wherein the blowing catalyst comprises N,N,N'-trimethyl-N'-3-aminopropylbis(aminoethyl) ether.

19. The method of claim 16, wherein the blowing catalyst comprises N,N,N'-trimethyl-N'-3-ureidopropylbis(aminoethyl) ether.

20. The method of claim 16, wherein the catalyst composition further comprises a carboxylic acid that forms a salt with one or both of the gelling catalyst and the blowing catalyst.

* * * * *

UNITED STATES PATENT AND TRADEMARK OFFICE
CERTIFICATE OF CORRECTION

PATENT NO. : 6,858,654 B1
DATED : February 22, 2005
INVENTOR(S) : Stephen Herman Wendel et al.

It is certified that error appears in the above-identified patent and that said Letters Patent is hereby corrected as shown below:

Column 13,
Row 55, delete  and substitute therefor --  --

Column 14,
Row 1, delete  and substitute therefor --  --

Column 15,
Row 21, delete "PS"

Row 26, delete  and substitute therefor --  --

Row 40, delete  and substitute therefor --  --

Column 16
Row 4, delete "chain" and substitute therefor -- contain --

Row 28, delete  and substitute therefor --  --

Row 45, delete  and substitute therefor --  --

Signed and Sealed this

Seventeenth Day of May, 2005

JON W. DUDAS
*Director of the United States Patent and Trademark Office*